Aug. 12, 1969
P. O. ROBARDS
3,460,401
HANDBRAKE MECHANISM
Filed Nov. 22, 1967
3 Sheets-Sheet 1
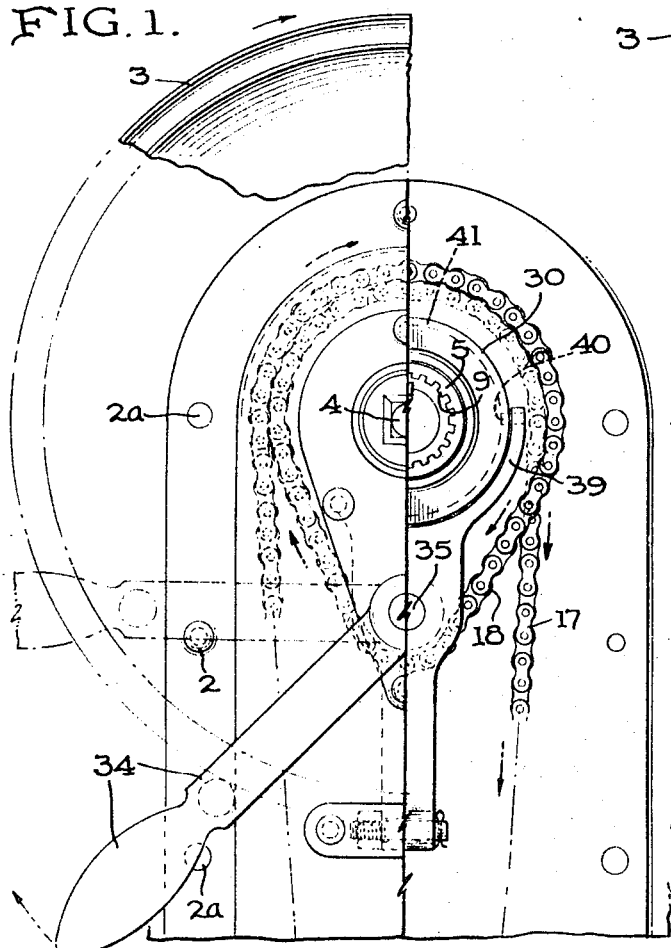
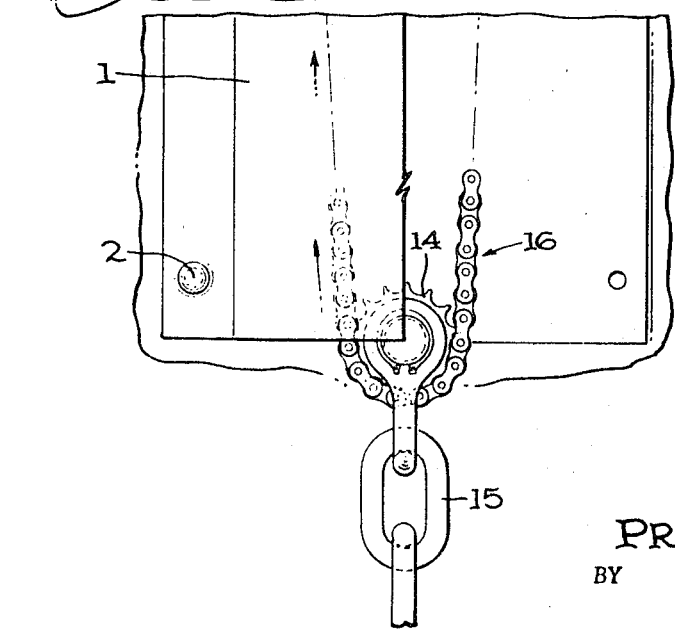
INVENTOR
PRESTON O. ROBARDS
BY Emory L. Groff Jr.
ATTORNEY

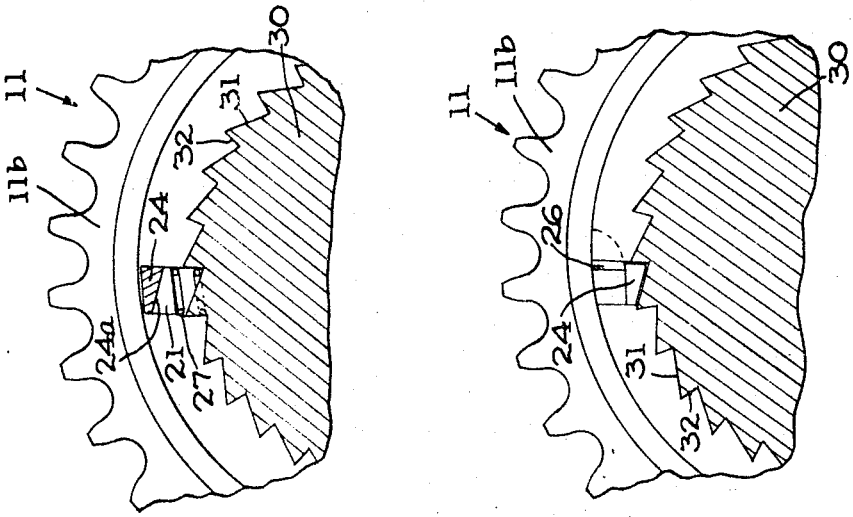
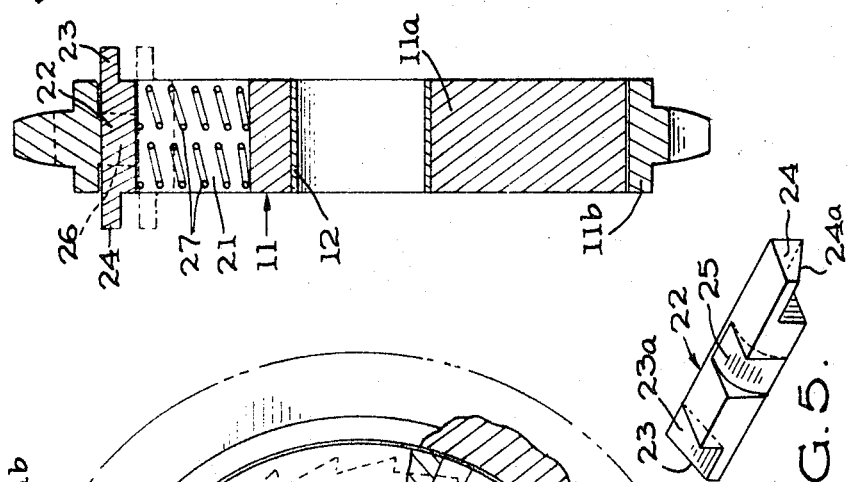
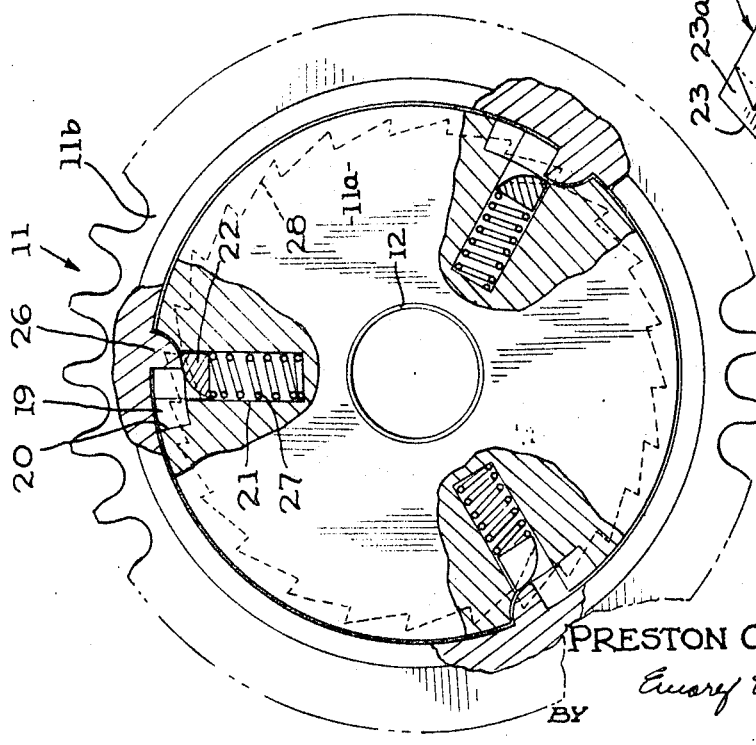

Aug. 12, 1969  P. O. ROBARDS  3,460,401
HANDBRAKE MECHANISM
Filed Nov. 22, 1967  3 Sheets-Sheet 3
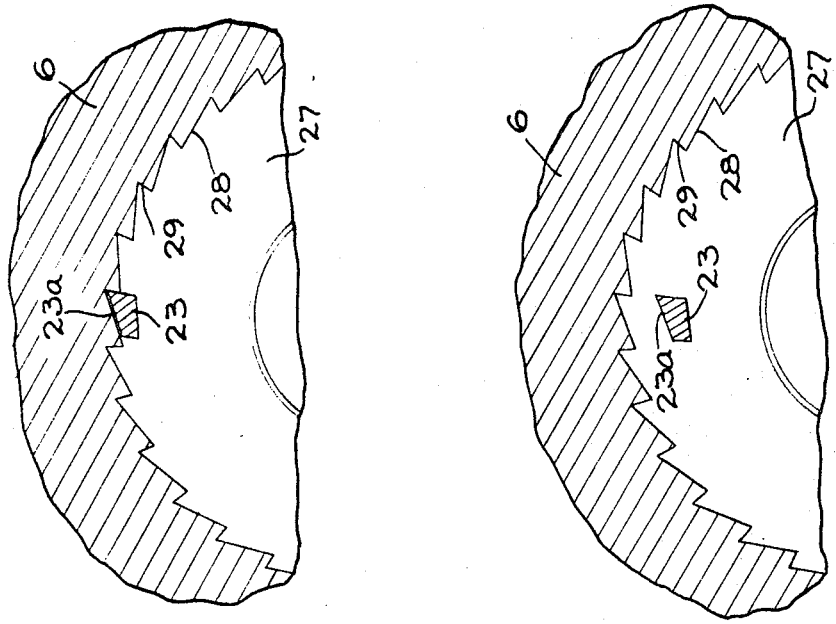
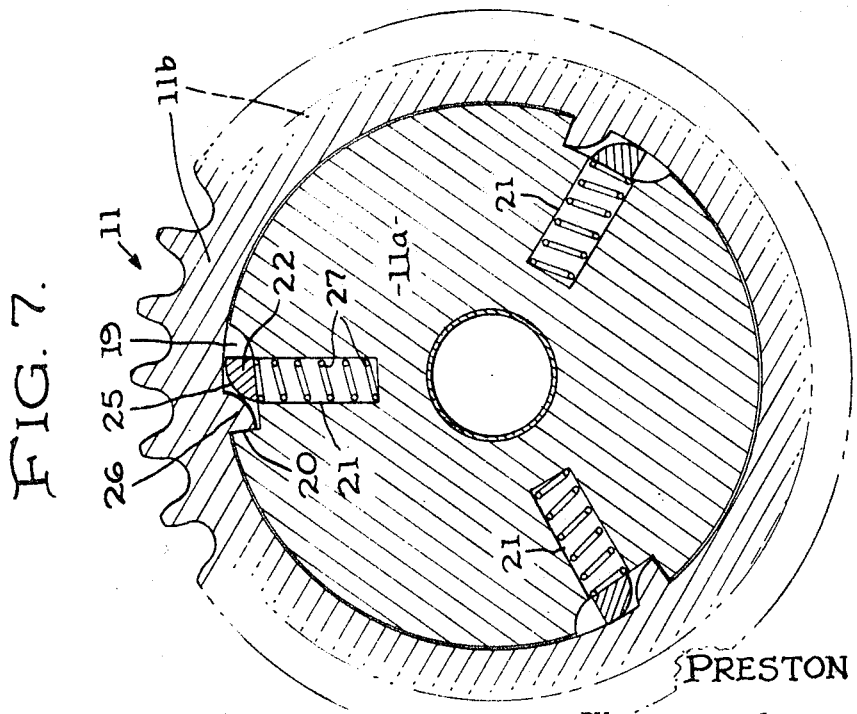
INVENTOR
PRESTON O. ROBARDS
BY
Emory L. Groff Jr.
ATTORNEY United States Patent Office 3,460,401
Patented Aug. 12, 1969

3,460,401
HANDBRAKE MECHANISM
Preston O. Robards, Roselle, Ill., assignor to Portec, Inc., a corporation of Delaware
Filed Nov. 22, 1967, Ser. No. 685,115
Int. Cl. G05g 1/08; B66d 3/14
U.S. Cl. 74—508                                   11 Claims

ABSTRACT OF THE DISCLOSURE

A handbrake mechanism for railway rolling stock including a plurality of roller chain pulleys about which the operator chain is sheaved. Means are provided with one pulley to immobilize the pulley during the slack take-up phase of operation, which means are automatically actuated upon completion of the slack take-up to permit rotation of the heretofore immobile pulley and provide a differential drive upon the operator chain.

---

This invention relates generally to brake mechanisms and more particularly to a hand brake mechanism of the differential pulley type specifically adapted for actuating brake devices as used on railway rolling stock. The present arrangement, in effect, provides a differential hoisting apparatus providing means for the quick removal of slack in the operator drive thereof.

Brake mechanisms utilizing a hand wheel for tightening of the brake rigging of a railway car are well-known wherein an operator turns the hand wheel initially, in order to take up the slack in a chain connected to the brake chain and subsequently continues rotation of the hand wheel to apply a pulling or upward force to the brake pull-up chain for the purpose of fully actuating the brake rigging mounted beneath the car. These devices usually employ a chain winding drum and utilize a pinion drive. The outstanding objections found in brake mechanisms of the above type as presently employed on the majority of railway cars is that an extremely large number of turns of the hand wheel are required in order to take up the prevailing slack in the brake rigging before any useful pulling force is applied to the brake chain itself. This arrangement has been necessary since an extremely large force ratio is required between the hand wheel and its attendant pulleys or sprockets and the brake chain itself in order to actuate the car brakes; however the preliminary take-up operation amounts to wasted time and movement on the part of the operator. Not only does the above take-up operation result in a waste of time and motion with the prior known devices, but possibly more important, is the long standing hazard known to exist whenever an operator mounts the end of a railway car and manipulates the conventional brake mechanism.

By the present invention a new and improved arrangement is provided wherein the initial turning of the hand wheel is conducted at a slower rate than now required, but yet provides an extremely rapid take-up of all of the slack present in the brake rigging, and after this slack has been taken up and a predetermined force is applied to the rigging, means are included for automatically shifting a heretofore stationary sprocket or pulley into an alternate position whereby a differential arrangement is provided to alter the force ratio prevalent between two sprockets and provide an increase in the resultant force being applied to the brake chain while decreasing the speed of the brake chain displacement.

Accordingly, one of the primary objects of the present invention is to provide a hand brake mechanism including an improved differential drive.

Another object of the present invention is to provide a hand brake mechanism including a plurality of sprockets or pulleys about which a single endless length of roller chain is sheaved and including means carried by one of these pulleys automatically immobilizing said pulley to provide a high speed take-up condition.

Still another object of the present invention is to provide a hand brake mechanism of the differential type including means automatically actuated for changing of a pulley drive arrangement from a quick take-up condition to a tightening condition upon the attainment of a preselected force upon the brake pull-up chain.

A further object of the present invention is to provide a hand brake mechanism of the differential pulley or sprocket type including a quick release member which, when actuated to one position, axially shifts one of the sprockets to a displaced position while concurrently changing the speed ratio of the sprocket drive assembly.

With these and other objects in view which will more readily appear as the nature of the invention is better understood, the invention consists in the novel construction, combination and arrangement of parts hereinafter more fully described, illustrated and claimed.

A preferred and practical embodiment of the invention is shown in the accompanying drawings in which:

FIGURE 1 is a fragmentary front elevation view of the hand brake mechanism of the present invention.

FIGURE 2 is a side elevation view, partly in section, of the mechanism shown in FIGURE 1.

FIGURE 3 is an enlarged front elevation view, partly in section, and illustrates one of the sprockets included in the present invention.

FIGURE 4 is a vertical sectional view of the sprocket shown in FIGURE 3.

FIGURE 5 is a perspective view of one of the dogs included in the small sprocket of FIGURES 3 and 4.

FIGURE 6 is a fragmentary view, partly in section, and illustrates portions of the small sprocket and large sprocket as they appear during the quick take-up condition in the present invention.

FIGURE 6a is a fragmentary view, partly in section, and illustrates the structure of FIGURE 6 as it appears during the differential condition of the present invention.

FIGURE 7 is a front sectional view illustrating the construction of the small sprocket forming a part of the present invention.

FIGURE 8 is a fragmentary view, partly in section, illustrating the back shaft bearing plate provided with internal ratchet teeth and illustrates the position of the dog during the quick take-up condition.

FIGURE 8a is a fragmentary view, partly in section, of the structure shown in FIGURE 8 and illustrates the position of the dog as it appears during the differential condition of the present invention.

Similar reference characters designate corresponding parts throughout the several figures of the drawings.

Referring now to the drawings, particularly FIGURES 1 and 2, the present invention will be seen to comprise a hand brake mechanism which is adapted to be mounted upon the end wall (not shown) of a railway car. For the most part, the assembly is contained within a housing 1 which is secured together by any suitable means such as rivets 2. A plurality of openings 2a are provided for fastening the assembly to the car end wall. A more or less conventional hand wheel 3 projects outwardly from the face of the housing 1 and is suitably attached to the outer end of a wheel shaft 4 which is journalled at its intermediate portion within a front shaft bearing hub 5 secured to the housing 1, and which has its innermost end similarly journalled within a back shaft bearing plate 6 disposed adjacent the end wall of the car. It will be noted, for reasons which will be explained hereinafter, that the rear portion of the front shaft bearing hub 5 projects inwardly within the housing 1 to provide a flange 7 which is spaced outwardly from the stepped portion 8 of the concentrically disposed wheel shaft 4. The inner surface of this flange 7 is provided with internal splines 9 extending about the periphery thereof.

Mounted upon the wheel shaft 4 within the housing 1 between the front shaft bearing hub 5 and back shaft bearing plate 6 are a pair of gear pulleys or sprockets specifically, a large sprocket 10 located adjacent the front bearing hub 5 and a smaller diameter sprocket 11 disposed adjacent the back shaft bearing plate 6. The large and small pulleys or sprockets 10 and 11, respectively, are not anchored directly upon the periphery of the wheel shaft 4. The large sprocket 10 is bored to provide a sliding fit with respect to the periphery of the shaft 4 and includes an axial broached slot (FIGURE 2) positioned adjacent a keyway 4a in the shaft 4. A suitable square key 4b mating with the broached hub of sprocket 10 and the keyway 4a precludes rotary displacement of the large sprocket 10 with respect to the wheel shaft 4. The hub of the small sprocket 11 includes a sleeve bearing 12 journalled about the outer periphery of the shaft 4 in a manner which permits free turning of this sprocket with regard to the wheel shaft. However, in view of the shoulder provided by the key 4b, it will be seen from FIGURE 2 that the small sprocket 11 is precluded from any axial displacement with respect to the wheel shaft 4 and back shaft bearing plate 6. The large sprocket 10, however, is arranged differently upon the shaft 4 as described above. The key arrangement will be seen to permit axial displacement of this large sprocket in the direction of the axis of the wheel shaft 4 while at the same time locking the large sprocket 10 to the wheel shaft 4 insofar as independent rotary displacement thereof is concerned.

A lateral recess 10a is provided in the front face of the hub of the large sprocket 10 and includes a series of external splines 13 on the inner wall thereof, as will be seen in FIGURE 2 of the drawings. The diameter of the external splines 13 is selected to provide a mating fit with the diameter of the internal splines 9 formed within the front shaft bearing hub 5.

The operation of the above described hand wheel and related large and small sprockets is intended to regulate the position of an idle sprocket or pulley 14 located adjacent the lower portion of the housing 1. The idle sprocket 14 is connected to the end of a brake pull-up chain 15 of well-known construction which in turn is connected to any suitable arrangement of rods or additional rigging eventually leading to the brakes disposed beneath the chassis of the railway car. As will be readily understood by those skilled in the art, the operation of a hand brake mechanism serves to pull the brake pull-up chain 15 upwardly when it is desired to apply the brakes upon a railway car, and conversely, move the brake pull-up chain 15 downwardly when the car's brakes are to be released.

The drive mechanism of the present invention utilizes a single endless operator roller chain 16 to regulate the vertical displacement of the idle sprocket 14, and thus control the application or release of the railway car's brakes. From a review of FIGURES 1 and 2 of the drawings, it will be seen that the roller chain 16 describes a pair of interconnected loops, one of which, the primary loop 17, begins at the top of the small sprocket 11, passes downwardly and is sheaved about the idle sprocket 14 and thence passes upwardly to the top of the large sprocket 10. The next, or secondary loop 18, extends from the top of the large sprocket 10 downwardly to a point below a release actuator block 19 and thence upwardly to the top of the small sprocket 11. In following the operation of the brake mechanism as thus described, it will be seen by a review of FIGURE 1 that in order to pull upwardly on the brake pull-up chain 15 that the hand wheel 3 must be turned in a clockwise direction as shown by the arrows in the drawing, whereupon the endless operator roller chain 16 will be moved in the directions shown by the arrows in FIGURE 1. This movement of the hand wheel 3 and its shaft 4 causes a corresponding rotational movement of the large sprocket 10 to begin the shortening of the primary loop 17.

At this point, further description will be made of the structure associated with the small sprocket 11 which is initially held stationary for the purpose of preventing downward movement of the primary loop 17 toward the idle sprocket 14 during the quick take-up operation of the present invention.

As shown in FIGURE 7, the small sprocket 11 is provided with a separate inner hub 11a having a circular outer periphery slidably disposed within the outer ring segment 11b of the sprocket, which ring segment includes the sprocket teeth. Equidistantly disposed about the periphery of the hub 11a are a plurality of cam recesses 19, each provided with a radial shoulder 20 at the left end thereof. Disposed inwardly from each cam recess 19 is a radial slot 21 extending toward the center of the sprocket hub 11a. A dog 22 is fitted within each of the recesses 19 and extends transversely of the hub 11a. The specific construction of each dog 22 is shown in the perspective view of FIGURE 5, wherein it will be seen that each end of the dog 22 includes a pawl, namely an inside pawl 23 at one end thereof and an outside pawl 24 at the other end thereof. An intermediate cam surface 25 is provided on each dog 22 and is adapted to cooperate with a radially extending cam 26 projecting inwardly from the outer ring of the sprocket 11. Each of the dogs 22 are urged to a normal position as shown in FIGURES 4 and 7 by means of a plurality of dog springs 27—27 disposed within each of the radial slots 21.

By considering FIGURES 8 and 8a together with FIGURE 2 of the drawings, the initial operation of the above described small sprocket assembly will be understood. The front face of the back shaft bearing plate 6 is provided with a circular recess 27 juxtaposed the hub 11a of the small sprocket 11. The outer periphery of the recess 27 is adjacent the outer periphery of the hub 11a and includes a plurality of internal ratchet teeth 28 each of which includes a stop shoulder 29 at the right hand side thereof. In the normal position as shown in FIGURES 2 and 8, it will thus be seen that the bias of the dog springs 27 urges each of the dogs 22 to the outermost limits within the cam recesses 19 such that the respective inside pawls 23 are urged into engagement within the internal ratchet teeth 28 formed in the back shaft bearing plate 6. By this arrangement wherein the top ratchet engaging surface 23a of each inside pawl 23 mates within the respective ratchet tooth 28 and is precluded from clockwise movement due to abutment with the nearest adjacent stop shoulder 29, it will be readily apparent that as the hand wheel 3 and wheel shaft 4 are rotated in a clockwise direction and the large sprocket 10 is similarly displaced, that the upward pull of the left hand portion of the primary loop 17 will be resisted by the stationary disposition of the right hand portion of the primary loop 17 due to the aforedescribed locking condition of the small sprocket 11. Thus, it will follow that as the hand wheel is turned to the right, each rotation of the large sprocket 10, due to its keyed connection to the wheel shaft 4, will cause a rapid shortening of the primary loop 17 with a corresponding increase in the length of the secondary loop 18 as the brake pull-up chain 15 is displaced upwardly to take up all slack in the brake actuating train between the two sprockets 10 and 11 and the brakes themselves.

The above described rapid take-up condition continues to exist during the turning of the hand wheel 3 until all of the slack is taken out of the brake actuating system from the upper end of the brake pull-up chain 15 to the car brake shoes themselves. In other words, as long as there is no positive resistance to the upward displacement of the idle sprocket 14 the large sprocket 10 will continue to rotate while the small sprocket 11 remains stationary by its rigid connection to the back shaft bearing plate 6 through the engagement of the inside pawls 23 with the internal ratchet teeth 28. During the shortening of the primary chain loop 17, the secondary chain loop 18 will be lengthened accordingly and the bottom of the secondary loop 18 will be displaced by mere gravity from the position shown in FIGURE 1 progressively to a lower point within the housing 1. The foregoing quick take-up condition continues until the point is reached wherein all of the slack is taken up within the system between the idle sprocket 14 and brakes, at which time there will occur a substantial increase in the resistance as applied to the right hand segment of the primary loop 17. In the prior known hand brake mechanisms, this sudden increase in resistance must be met with a substantial increase in the application of force as applied to the hand wheel 3 in order to continue rotation of the winding means to actuate the brakes beneath the car; however in the present invention means are included for the automatic shifting of the mechanism from a single direct drive at this point to a differential drive which produces an increase in the force ratio and, of course, a corresponding decrease in the speed of vertical displacement of the idle sprocket 14.

As a greater resistance is applied in a downward direction to the right hand segment of the primary loop 17, it will be seen most clearly from FIGURE 7 that the resultant force as applied by the operator roller chain 16 sheaved about the upper portion of the small sprocket 11 will increase the tendency of this sprocket to rotate in a clockwise direction. The cams 26, which up to this point have abutted the cam surfaces 25 of the dogs 22, will begin to move in a clockwise direction as the outer ring 11b of the small sprocket 11 is displaced to the right with a corresponding inwardly and radial displacement of each of the dogs 22 within the radial slots 21 against the force of the dog springs 27. As the downward force continues to increase on the right hand segment of the primary loop 17 and the outer ring of the small sprocket 11 proceeds further to the right, the assembly of the sprocket 11 will appear as in FIGURE 3 of the drawings, wherein it will be seen that the dogs 22 will each be displaced inwardly toward the center of the small sprocket, below the bottom of each of the cam recesses 19 within the sprocket hub 11a. In this position the related inside pawl 23 will be seen to be displaced from the position as shown in FIGURE 8 to the position shown in FIGURE 8a whereupon the small sprocket 11 becomes fully disengaged from the back shaft bearing plate 6.

By referring now to FIGURES 2, 6 and 6a, it will be seen that the hub 30 of the large sprocket 10 is provided with a series of external ratchet teeth 31 on the rear face thereof, each of which teeth are provided with a stop shoulder 32 facing in the same direction as the stop shoulders 29 of the internal ratchet teeth 28 formed in the back shaft bearing plate 6. By examining FIGURE 2 it will be clearly evident that the outside diameter of the circle encompassing the external ratchet teeth 31 on the large sprocket hub 30 is substantially smaller than the diameter of the circle encompassing the internal ratchet teeth 28 formed in the back shaft bearing plate 6. By this arrangement it will be understood that when the small sprocket 11 assumes the position as shown in FIGURE 3, following a substantial predetermined increase in resistance upon the right hand segment of the primary loop 17, the disengagement of the inside pawl 23 from the internal ratchet teeth 28 will be followed by a concurrent engagement of the opposite or outside pawl 24 within the external ratchet teeth 31 on the large sprocket hub 30 as shown in FIGURE 6a of the drawings. When the cams 26 are fully directed to the right hand portion of each of the cam recesses 19, as illustrated in FIGURE 3, the free end of the cams 26 rest upon the top of the cam surface 25 of each of the dogs 22 such that the outside pawls 24 will fully mate within the external ratchet teeth 31 on the large sprocket hub 30, as shown in FIGURE 6a. In this manner it will be understood that the small sprocket 11 thus becomes interconnected with the large sprocket 10 so that with each subsequent rotation of the hand wheel 3 and its keyed large sprocket 10, the small sprocket 11 will likewise make a single rotation. It is at this point that the differential condition of the present invention begins, for as the left hand segment of the primary loop 17 is moved upwardly by one revolution of the hand wheel, at the same time the right hand portion of the primary loop 17 will be moved downwardly a lesser amount than the aforedescribed upward movement of the left hand segment due to the passage of the upper portion of the right hand segment about the smaller diameter sprocket 11. With this differential condition, many more turns of the hand wheel 3 are required to vertically displace the idle sprocket 14 with the attendant result that a much greater force ratio is available to the brake operator to enable much less effort to be required to vertically displace the brake pull-up chain 15 which is now applying a direct pull on the brake rigging of the railway car.

In order to preclude jumping of the operator roller chain 16 from the top of the small sprocket 11 during operation of the present invention, an overhang 33 projects outwardly from the top of the back shaft bearing plate 6 and is disposed above the top of the small sprocket an amount substantially less than the thickness of the roller chain. Similar protection against jumping of the chain 16 from the top of the large sprocket 10 is available by forming the top wall of the housing 1 at a point immediately adjacent the top of the teeth of this sprocket.

The brakeman continues operation of the hand wheel until it is determined that the brake rigging of the car is fully set. Due to the differential arrangement the present system is inherently self-locking and when any force is removed from the hand wheel 3 the system remains motionless regardless of the existing load on the brake pull-up chain 15. In addition to being self-locking, the differential condition permits a controlled release of force by an operator due to the reversible nature of the drive mechanism. Thus, an operator, sensing that he has applied too much brake to reach his destination while riding a car down an incline, can relieve the brake application by turning the wheel 4 backwards.

Means are provided in the form of a quick release lever 34 to permit the disengagement of the aforedescribed differential condition when it is desired to rapidly lengthen the primary loop 17 and shorten the secondary loop 18 in order to relieve pressure upon the rigging.

The operation of this phase of the invention will be most readily apparent from a review of FIGURE 2 of the drawings, wherein it will be seen that the lever 34 is fixedly attached to a release shaft 35 suitably journalled at a point adjacent the housing 1 on the one hand, and having its rear portion journalled within the lower area of the back shaft bearing plate 6. Adjacent the rear of the shaft 35 is a release actuator block 19 which is fixedly attached to the release shaft 35 and includes one or more outwardly projecting nodes 36 on the forward edge thereof. Surrounding the shaft 35, but not attached thereto, is a release arm 37 having its lower end pivoted as at 38 to the housing 1 and including an upper fork 39, each free end of which is provided with an inwardly directed pin 40, as will be seen in FIGURE 1. Each of these pins 40—40 are slidably disposed within a peripheral groove 41 provided in the forward portion of the hub 30 of the large sprocket 10. The release arm 37 is constantly urged to its normal position as shown in FIGURE 2 by means of a compression spring 42 which bears, on the one hand, against the inner surface of the front shaft bearing hub 5, and on the other hand, against a thrust bearing 43 positioned within the outer limits of the lateral recess 12 formed in the hub of the large sprocket. In the described normal position it will be observed that the nodes 36 on the release actuator block 19 mate or engage within complementary recesses 44 integral with the back side of the release arm 37.

When the brake is set and the operator desires to quickly release the brake mechanism, the release lever 34 is moved from the full line position shown in FIGURE 1 to the broken line position, which movement will be understood to cause a corresponding rotation of the actuator block 19 from the position shown in FIGURE 2, whereupon the nodes 36 on the block 19 will be displaced from within the recesses 44 on the rear surface of the arm 37 to force the release arm 37 forwardly about the pivot 38. As this movement occurs, the pins 40 carried by the fork 39 at the upper end of the release arm 37 will axially displace the large sprocket 10 forwardly against the force of the spring 42 with the external splines 13 of the large sprocket hub 30 meshing with the internal splines 9 within the front shaft bearing hub 35, whereupon it will be realized that the large sprocket will thus be locked against any possible rotation. During the course of the aforedescribed axial displacement of the large sprocket 10 away from the small sprocket 11 the outside pawl 24 of the dogs 22 will be axially displaced from their engagement within the external ratchet teeth 31 of the large sprocket; however the interlocking action between the large and small sprockets due to the outside pawl will not be terminated until after the external splines 13 of the large sprocket have engaged the internal slines 9 on the bearing hub 5. At this point the small sprocket 11 will be free to rotate to effect a quick release of applied force to the brake rigging.

When it is desired to return the brake mechanism to its normal condition, the operator removes force upon the release lever 34 and it returns by gravity to the position shown in FIGURE 2, which causes disengagement of the interlocked splines 8 and 13 and return of the large sprocket 10 to abutment with the small sprocket 11.

From the foregoing it will be seen that an improved hand brake mechanism is provided having a unique rapid take-up combined with a differential system and including a quick release arrangement, the operation of which precludes the possibility of winding the brake up backwards.

I claim:

1. In a hand brake mechanism for applying a pull and release motion upon a brake chain, a rotatable wheel shaft, said shaft mounted within a front hub and a rear bearing plate, a pair of sprocket gears having dissimilar diameters disposed upon said shaft, means interlocking a first one of said gears to said shaft to preclude relative rotary displacement therebetween, movable means carried by the second one of said gears operable from a first condition wherein said second gear is locked relative to said rear bearing plate to a second condition wherein said second gear is locked relative to said first gear, an endless operator chain sheaved about both of said gears and providing depending primary and secondary loops, said primary loop sheaved about an idle gear at the bottom thereof, and said idle gear connected to said brake chain, whereby, when slack exists in said brake chain and said shaft is rotated, said second gear remains immobile as said first gear rotates to rapidly shorten said primary loop until a predetermined increase in resistance is met in said brake chain at which point said movable means is automatically actuated to interlock said second and first gears to provide a differential operator chain drive upon continued rotation of said shaft.

2. A hand brake mechanism according to claim 1, wherein, said first gear is of a larger diameter than said second gear.

3. A hand brake mechanism according to claim 1, wherein, said interlocking means permits axial displacement of said first gear.

4. A hand brake mechanism according to claim 1, wherein, said movable means includes a displaceable dog having an inside pawl projecting toward said rear bearing plate, ratchet means on said rear bearing plate adapted to engage and retain said pawl when said shaft is rotated to initially shorten said primary loop.

5. A hand brake mechanism according to claim 4, wherein, said second gear includes, a hub disposed within a separate outer ring, said hub having a peripheral recess communicating with a radial slot, a cam on the inner periphery of said outer ring positioned within said recess, said dog normally disposed in said recess, and spring means urging said dog into contact with the inner periphery of said outer ring and said inside pawl into ratchet means, whereby, when the resistance offered by said primary loop increases to a predetermined level said cam overcomes the force of said spring means to displace said dog radially inwardly to disengage said inside pawl from said ratchet means.

6. A hand brake mechanism according to claim 5, wherein, the medial portion of said dog is provided with a cam surface adjacent said cam on said outer ring.

7. A hand brake mechanism according to claim 5, wherein, said dog is provided with an opposite outside pawl projecting toward said first gear, and said first gear including ratchet means adjacent said outside pawl, whereby, when said dog is displaced radially inwardly and said second gear is disconnected from said rear bearing plate said outside pawl engages said first gear ratchet means to interlock said pair of gears.

8. A hand brake mechanism according to claim 7, wherein, said ratchet means on said rear bearing plate comprises a circle of internal ratchet teeth and said ratchet means on said first gear comprises a circle of external ratchet teeth.

9. A hand brake mechanism according to claim 8, wherein, said inside pawl includes a top surface adapted to engage said internal teeth and said outside pawl includes a bottom surface adapted to engage said external teeth.

10. A hand brake mechanism according to claim 3, wherein, said front hub is internally splined adjacent said first gear and said first gear is externally splined adjacent said front hub.

11. A hand brake mechanism according to claim 10, including, a pivotal release arm connected to said first gear, and a lever acting on said arm to pivot the arm to axially displace said first gear whereby said first gear may be alternately immobilized and released for rotary movement by coaction of the splined portions of said hub and first gear.

References Cited

UNITED STATES PATENTS

| 554,131 | 2/1896 | Maris | 192—15 |
| 580,167 | 4/1897 | Yenn | 187—23 |
| 668,166 | 2/1901 | Diehl et al. | 192—66 |
| 684,390 | 10/1901 | Yenn | 187—23 |
| 1,435,859 | 11/1922 | Kiesling | 192—15 |
| 1,864,729 | 6/1932 | Heitner | 74—508 |
| 2,054,651 | 9/1936 | Burnett | 74—508 |

FRED C. MATTERN, Jr., Primary Examiner

W. S. RATLIFF, Jr., Assistant Examiner

U.S. Cl. X.R.

254—188